(No Model.)
2 Sheets—Sheet 1.

E. SAUERMILCH.
WEIGHING AND PRICE SCALE.

No. 331,090. Patented Nov. 24, 1885.

WITNESSES:
A. Schehl
E. Wolff

INVENTOR
Emil Sauermilch
BY Goepel & Raegener
ATTORNEYS.

(No Model.) 2 Sheets—Sheet 2.

E. SAUERMILCH.
WEIGHING AND PRICE SCALE.

No. 331,090. Patented Nov. 24, 1885.

WITNESSES:
A. Schehl
E. Wolffe

INVENTOR
Emil Sauermilch
BY
Goepel & Raegener
ATTORNEYS.

UNITED STATES PATENT OFFICE.

EMIL SAUERMILCH, OF NEW YORK, N. Y.

WEIGHING AND PRICE SCALE.

SPECIFICATION forming part of Letters Patent No. 331,090, dated November 24, 1885.

Application filed October 11, 1884. Serial No. 145,223. (No model.)

*To all whom it may concern:*

Be it known that I, EMIL SAUERMILCH, of the city, county, and State of New York, have invented certain new and useful Improvements in Weighing and Price Scales, of which the following is a specification.

This invention has reference to an improved weighing and price scale which is so constructed that the value of the articles weighed upon the scale can be readily read off upon a disk upon which is marked the price per pound of the article; and the invention consists of a spring-balance or other weighing apparatus provided with a disk that is subdivided by radial lines and concentric circles into a series of columns, in which the price or weight of the different articles per pound are marked, the inner circle indicating the weight of the article. A fixed index having on its face concentric subdivisions extends radially across the face of the disk, having on its face short transverse marks in line with the concentric subdivision-lines of the disk.

Figure 1:
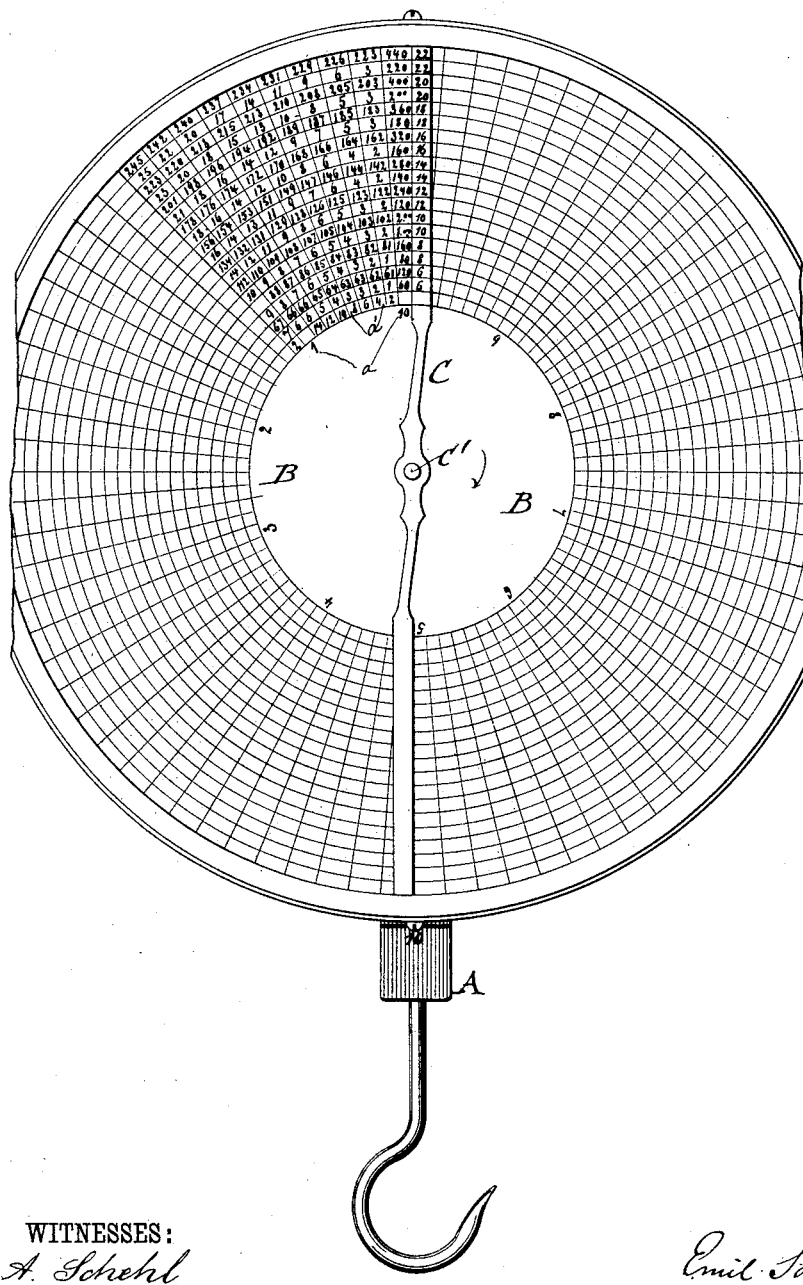
Figure 2:
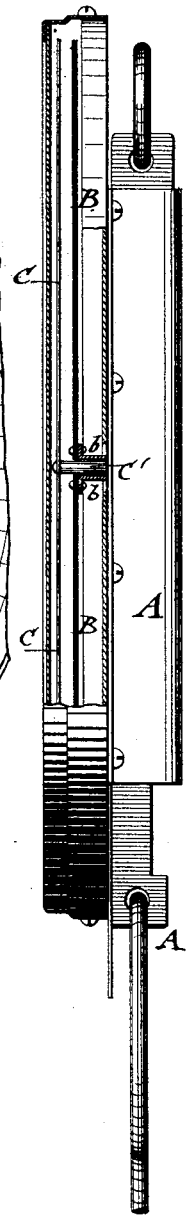
Figure 3:
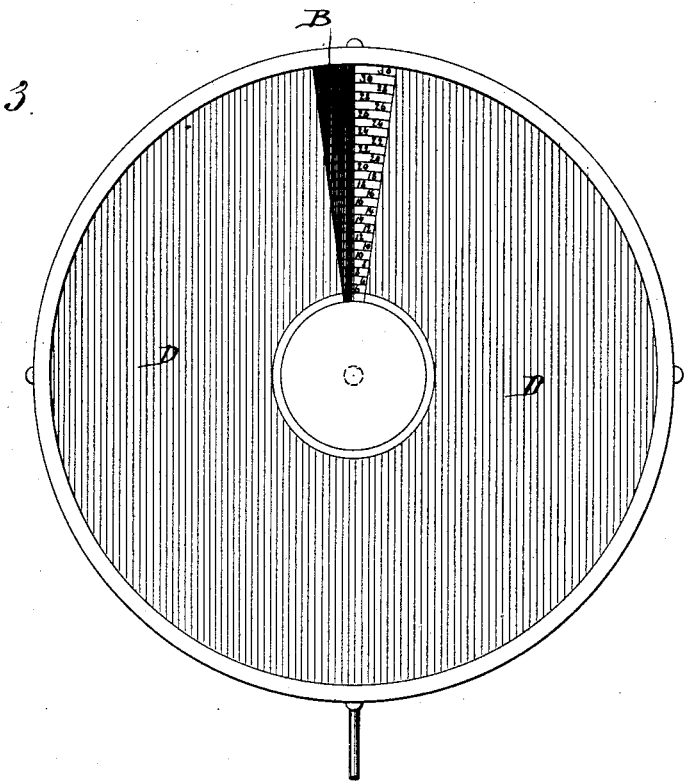
Figure 4:
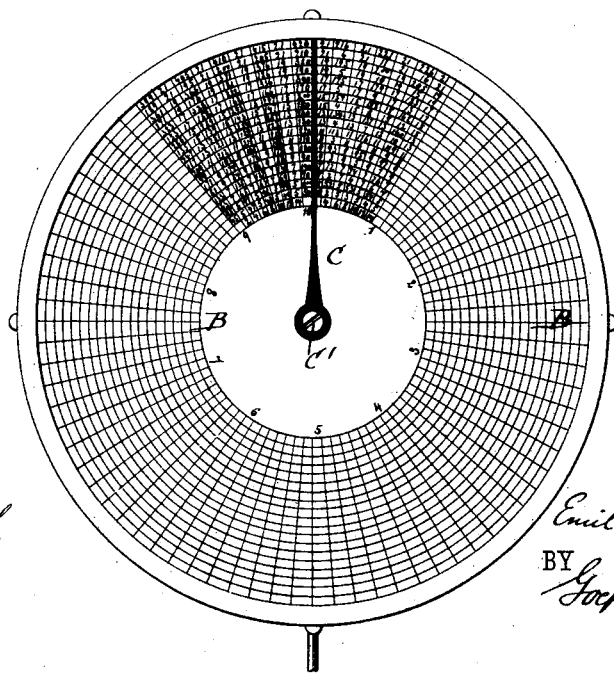

In the accompanying drawings, Figure 1 represents a front elevation of my improved automatic scale-calculator. Fig. 2 is a side view of the same, partly in section; and Figs. 3 and 4 are modified constructions of the same.

Similar letters of reference indicate corresponding parts.

In the drawings the calculator is represented in connection with a spiral spring-balance, A, of the ordinary construction, which is shown in Figs. 1 and 2 in the drawings, but not in detail. The calculator is provided at one or both sides with a calculating-disk, B, which is attached to a tubular spindle, $b$, that is operated by the mechanism of the spring-scale so as to be rotated according to the weight of the article placed on the pan of the scale. The disk B is divided by concentric circles and radial lines into a series of radiating columns, in which the computed price per pound and ounces of the weight of the article is placed. The inner circle indicates the weight of the article in pounds and ounces, while the radial columns indicate the corresponding prices at different rates per pound. The prices for articles weighing, respectively, two, four, six, eight, ten, twelve, and fourteen ounces are given as, respectively, one, two, three, four, five, and six cents, (at the rate of six cents per pound,) which prices are all only approximate, save three cents for eight ounces, and so at the other rates per pound. The figures for whole pounds are located on the inner margin, $a$, of the inner circle, while the figures for ounces are located in the inner circle, $a'$. A fixed index, C, is supported on a fixed spindle, C', that passes through the hollow spindle $b$ of the rotating disk B, the index being at zero when the balance is in a normal position of rest. The face of the fixed index C is marked with short transverse lines in line with the concentric circles of the disk, so as to form subdivisions, in which the different rates or prices of the articles per pound are placed. When the spring-balance is intended to weigh only up to ten pounds, the concentric circles of the disk B and of the index C indicate the price from one ounce to ten pounds; but when the spring-balance is adapted to weigh up to twenty pounds the disk has to be turned twice on its axis, in which case the concentric circles of the disk are grouped in pairs, and also the subdivisions on the face of the index, the subdivisions of the first circle of a pair indicating the price of the weight up to ten pounds, while the figures in the second circle of the pair indicate the price of the weight up to twenty pounds. The pound-price of the article is marked twice on the index C, so as to place the figures sidewise of each pair of concentric circles, as shown in Fig. 1. When the spring-balance is adapted to weigh up to thirty pounds, the concentric circles have to be divided into groups of three, the first group indicating the weight up to ten pounds, the second up to twenty pounds, and the third up to thirty pounds. The price per pound is in this case repeated three times on the face of the index, so as to indicate it for each circle of a group, and facilitate thereby the quick and correct reading off of the total price of the article to be weighed in the corresponding circle of the group.

On the sliding beam of the scale are arranged the numbers 10, 20, and 30, so as to indicate thereby in which concentric circle of each group the price per pound of the weight of the article is to be read off.

For convenience sake it may be preferable to arrange a calculating-disk at opposite sides of the scale, one disk being used for reading off the price with even figures per pound, while the opposite disk is used for reading off the price for even numbers per pound.

It is obvious that in place of rotating the disk along a fixed index the index may be rotated and the disk be fixed, in which case, however, the figures cannot be placed symmetrically in the radial columns from the inner circle, but have to be arranged in proper relative positions toward the vertical and horizontal axis of the disk, so as to permit the convenient reading off of the figures.

In the modification shown in Fig. 4 the index C is not graduated, but the price per pound is arranged in radial columns intermediately between the columns containing the price of the weight of the article. The reading off is accomplished in the same manner as when the price per pound is marked on the index, as one of the columns where the index stops indicates the price per pound, and the adjoining column the calculated price of the weight of the article.

In Fig. 3 another modification is shown, in which, in place of the index, a covering-disk, D, with a radial slot, is shown. The columns of the calculating-disk appear in said slot, so that they can be conveniently read off in connection with the pound-price marked alongside of the slot without creating confusion.

The arrangement of the subdivisions of the calculating-disk may be varied from those shown and described, provided that the price of the weight of the article calculated at different rates per pound is arranged in radial columns to the figures, indicating the weight of the articles.

I am aware that automatic calculators for scales have been used heretofore; but the construction was more or less complicated, required adjustment, and did not permit the convenient reading off of the figures.

Having thus described my invention, I claim as new and desire to secure by Letters Patent—

1. A calculating-disk for spring-balances having circles subdivided so as to indicate the weight of the article, and a series of radial columns divided by concentric circles into spaces in which are alternately placed the prices of the weight calculated to different rates per pound up to the full scope of one revolution on said disk, and similar prices for the weights indicated by the second revolution, substantially as described.

2. A price-scale comprising a spring-balance, a calculating-disk rotated thereby, said disk having circles subdivided so as to indicate the weight of the article, and a series of radial columns divided by concentric circles into spaces in which are alternately placed the prices of the weight calculated to different rates per pound up to the full scope of one revolution on said disk, and similar prices for the weights indicated by the second revolution, and a fixed index the face of which is subdivided corresponding to the subdivisions of the disk, and marked with different prices per pound for such subdivisions, the same price-marks being opposite the corresponding subdivisions of the radial columns, substantially as described.

3. A price-scale comprising a spring-balance, a calculating-disk rotated thereby, said disk having circles subdivided so as to indicate the weight of the article, and a series of radial columns divided by concentric circles into spaces in which are alternately placed the prices of the weight calculated to different rates per pound up to the full scope of one revolution on said disk, and similar prices for the weights indicated by the second revolution, a fixed index the face of which is subdivided corresponding to the subdivisions of the disk and marked with different prices per pound for such subdivisions, the same price-marks being opposite the corresponding subdivisions of the radial columns, and an indicator on the scale-beam for designating the proper series of price-circles, substantially as described.

In testimony that I claim the foregoing as my invention I have signed my name in presence of two subscribing witnesses.

E. SAUERMILCH.

Witnesses:
PAUL GOEPEL,
SIDNEY MANN.